Sept. 17, 1963 L. E. BODKIN 3,104,109

STYLUS AND RECORD PROTECTOR AND ADAPTER THEREFOR

Filed April 17, 1959 2 Sheets-Sheet 1

INVENTOR.
LAWRENCE E. BODKIN
BY George H. Baldwin
ATTORNEY

INVENTOR.
LAWRENCE E. BODKIN
BY
George H. Baldwin
ATTORNEY

3,104,109
STYLUS AND RECORD PROTECTOR AND ADAPTER THEREFOR

Lawrence E. Bodkin, 1833 Ryar Road, Jacksonville, Fla.
Filed Apr. 17, 1959, Ser. No. 807,746
27 Claims. (Cl. 274—1)

This invention relates to a protector for records and stylii and to an adapter for such records and stylii. More particularly the invention pertains to a protector and adapter for stylii and records of the type wherein the stylus traverses the record groove for the reproduction of sound. The invention also relates to an improvement in processes of reproducing wherein a stylus is caused to traverse a record groove.

In the reproduction of sound which has been mechanically incorporated in phonograph records and the like, a needle or stylus is caused to traverse the record groove so as to "pick up" the directional deviation in the groove and, in effect, to transmit the intelligence represented thereby to suitable means for transforming it into audible waves.

The fidelity of the reproduction depends in part upon the condition of the record groove and upon the shape of the stylus. If the groove is chipped and worn or otherwise damaged, the course traversed by the stylus in the groove becomes erratic and noises develop in the reproduced sounds. On the other hand, if the stylus is worn, it tends to create excessive record wear and to produce noises which also interfere with true sound reproduction.

Record wear is less when a stylus of ideal shape is employed, i.e. a stylus which has a rounding tip. A stylus originally of this shape, however, becoming worn through use, tends to change in shape and to acquire a generally wedge-shaped tip which digs into the walls and base of the groove resulting in cutting, grinding and chipping of the walls and base of the groove. Many stylus materials have been suggested and employed in attempts to produce stylii which will wear very slowly, and diamond-tip stylii have approached a solution to the problem in many respects. However, they are expensive and subject to cleavage and breakage, and have a life which seldom or never exceeds about 1,000 hours. Thereafter they must be replaced.

It is, accordingly, an object of this invention to protect the stylus tip from wear, and, to minimize record wear as well as stylus wear.

It is a further object of the invention to substantially eliminate stylus wear by eliminating frictional contact between the stylus and record, thereby making possible the wider use of less expensive stylii.

Another object is to minimize record wear and damage by eliminating direct contact between the hard stylus and the record.

Another object of the invention is to improve processes for reproducing sound wherein a stylus is caused to traverse a groove of a phonograph record.

Shellac records, because of limitations in the characteristics of the materials, are formed with wide and deep grooves requiring a stylus with a relatively large tip radius to distribute the stylus pressure over a wider area in the record groove than that which would be contacted by a 1-mil stylus of the type adapted for use with more modern long-playing records. "All purpose" stylii having a 2-mil radius are sometimes used with both types of records, but it is preferable to employ a stylus having a 3-mil radius tip with shellac records and a stylus having a 1-mil radius tip with microgroove records to maintain record wear at a minimum. It is, accordingly, common practice to change between stylii of 1-mil and 3-mil tip radii to adapt the phonograph for playing microgroove records on the one hand and large groove records, such as 78 r.p.m. shellac records, on the other hand.

An important object of this invention is to provide an adapter for a stylus having a tip of small radius whereby said stylus may be employed with large groove records.

A particular object of this invention is to provide a simple adapter by means of which 78 r.p.m. records, whether of vinyl or shellac, may be played by a microgroove type stylus, having, for example, a 1.0 mil radius tip, with high fidelity and without damage to either the record or the stylus, thereby to eliminate the need of changing stylii when changing from microgroove records to 78 r.p.m. records.

Another object of the invention is to provide, in a system for reproduction from a grooved record wherein a stylus is caused to traverse the record groove, methods for improving reproduction and reducing record and stylus wear.

Another object of the invention is to provide an improved sound reproducing process in which the wearing of records and stylii is minimized and in which noises incorporated in the records are suppressed without adversely affecting the fidelity of the reproduction.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Figures 1, 2, 3, 4, 5, 6:
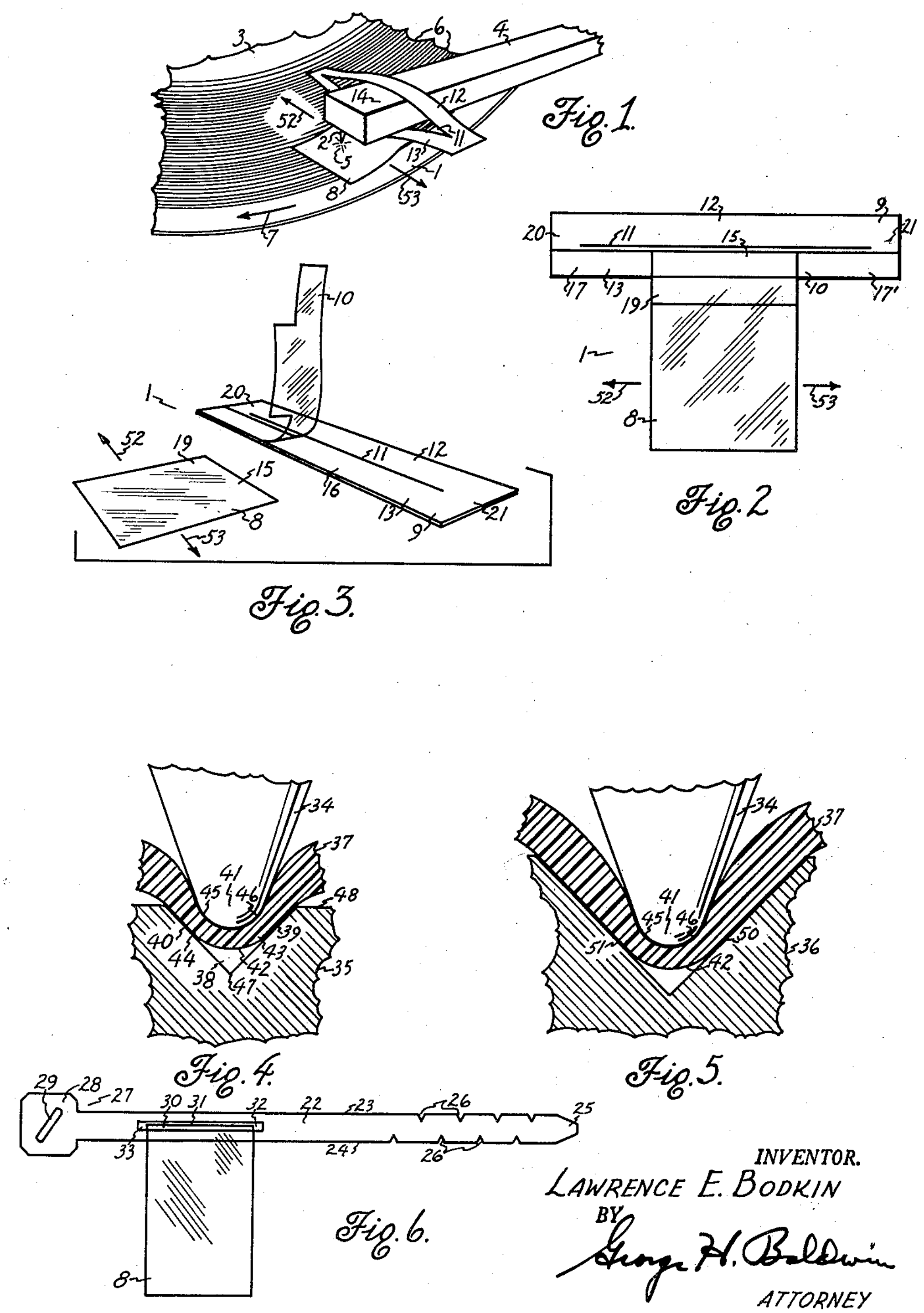
FIG. 1 is a perspective view of one embodiment of the invention showing its relative operating position with respect to a stylus and record.
FIG. 2 is a top plan view of the embodiment shown in FIG. 1.
FIG. 3 is a partially exploded view showing the elements of the embodiment shown in FIG. 2.
FIG. 4 is a fragmentary enlarged cross sectional view of a record showing the operating relationship of the protector and needle in a record groove.
FIG. 5 is a fragmentary enlarged cross sectional view of another type record having a deeper groove and showing the operating relationship of the protector and needle therewith.
FIG. 6 is a plan view of another embodiment of the invention.

The protector element of the herein described invention essentially consists of a sheet of material which underlies the stylus of a phonograph and overlies the phonograph record during its use. It is preferably connected to the stylus by means of a loose connection with the stylus carrying pick-up or tone arm, and forms a localized covering or sheath for the stylus tip that prevents direct contact between the record and the stylus, the protective sheet being so disposed during use as to absorb the wear from the record instead of the stylus per se. In actual use, a portion of the protective sheet material is drawn over the stylus tip to form a cover which, in its drawn position thereover, traverses the record groove and is in frictional contact therewith. As such the stylus tip is protected from the abrading action of the record and in turn, the record is protected from the wearing action of the hard pointed stylus by the softer protector material. The protective cover produces less wear on the record than the hard stylus because of its relatively softer and preferably slightly resilient nature which permits it to absorb the record damaging shocks caused by the stylus when it encounters dust particles and the like. Frequently, such particles cause the stylus to bounce around in the record groove. This causes chipping of the record and imparts noises to the sound reproduction.

The sheet element forming the protective element must, of course, be thin enough to be disposed within the groove of the phonograph record between the tip of the stylus and the walls of the groove. It should be composed of a tough and ductile material capable of withstanding friction with the groove walls and of withstanding the stretching or the drawing of the material over the tip of the stylus without being easily pierced. Preferably the film sheet has low frictional characteristics and is resistant to rupture to the extent that it conforms with the stylus contour when depressed by the stylus into the record groove rather than being pierced thereby. Membranous sheets composed of polyethylene or the halogenated derivatives thereof such as polytetrafluoroethylene are especially well suited for the applications contemplated by the invention. Sheets of polyethylene film having, for example, a thickness ranging from ½ mil to about 3 mils have been found particularly effective for this purpose and especially so because of their low coefficient of friction with record surfaces. Strained polyethylene film sheets are especially resistant to abrasion as hereinafter more particularly pointed out. Sheets of polytetrafluoroethylene have exceptional friction resistance. Other plastic type film sheets are also contemplated. Sheets of nylon have been employed with beneficial results. Polyester films, such as those composed of Mylar, a product of the E. I. du Pont Company of Wilmington, Delaware, have been successfully employed. Saran, being a well known plastic product of the Dow Chemical Corp. of Midland, Michigan, has been successfully employed. However, sheets of Saran and Mylar have a greater tendency to wear through than polyethylene film sheet of similar thickness and are less desirable for this reason. Membranous film sheets of aluminum and copper foil may also be employed, although less successfully than polyethylene for the reason that they are too readily pierced by the stylus tip as compared to the more successfully employed polyethylene sheets. Other materials will be apparent to those skilled in the art, ductility being the principal property desired of the material so as to be sufficiently pliant for stretching over and molding itself about the stylus tip. Certain materials tend to electrostatically attract dust particles from within the record grooves and accordingly serve to clean the record grooves as well as to function as protecting elements.

One embodiment of the phonograph stylus and record protector 1 is shown in FIGS. 1, 2 and 3, FIG. 1 illustrating the general operating position of the protector 1 with respect to the stylus 2 and the phonograph record 3 whereas FIGS. 2 and 3 illustrate the protector itself.

With respect to FIG. 1, the stylus 2 is mounted on the underside of pick-up or tone arm 4, the protector 1 being loosely connected to the tone arm 4 behind the stylus and extending forwardly thereunder to a position underlying the stylus 2. The stylus 2 rides on the upper surface of the protective film sheet 8 and forms a dimple 5 therein which projects downwardly into the groove 6 of the record 3 forming a sheath-like cover for the stylus tip. The record 3 revolves in the direction illustrated by the arrow 7 and accordingly tends to dispose the stylus and record protecting film sheet 8 below the stylus 2 as the arm swings automatically or manually down onto the record with each successive playing thereof.

The protector 1 illustrated in FIGS. 1 through 3 is composed of a ductile film sheet 8 which is adapted to support the stylus 2 in the record groove 6, an elongated flat flexible sheet 9 which serves as a strap for loosely connecting the protector to the tone arm 4, and an adhesive strip 10 which is adapted to secure the sheets 8 and 9 together. The elongated flexible sheet 9 has a slot 11 which extends lengthwise generally between opposite ends 20 and 21 thereof and which divides the sheet into opposite side portions 12 and 13. These side portions 12 and 13 are parted to open the slot 11 when the protector 1 is placed over the end 14 of the tone arm 4 and because of their flexible nature they engage the top and bottom respectively of the tone arm 4 in a loose connection which permits the film sheet to freely shift when the stylus is disengaged from the groove 6. This freely shiftable connection to the tone arm 4 permits the stylus tip to engage the film sheet 8 at random points with each successive playing of a record. Because of the small area of stylus contact at each random point, the probabilities of engaging a previously used or pierced point of contact are practically nil for many hundreds of plays. The connection is such that the normal jarring of the tone arm 4 which occurs as the arm is swung outwardly between successive records causes the protector to shift on the arm 4 and thereby present a new point of stylus contact for the following playing of a record.

End portion 15 of sheet 8 is disposed adjacent to the slot 11 of flexible sheet 9 and in an overlying position with respect to portion 16 of flexible sheet 9. Portion 16 lies intermediate the ends 20 and 21 of sheet 9, transparent adhesive strip 10 connecting the sheets 8 and 9 by overlying and adhering to the end portion 15 of sheet 8 and the portions 17 and 17' of sheet 9 adjacent to its portion 16. The adhesive strip 10 in the embodiment has an integral extension 18 which adheres to and overlies the portion 19 of sheet 8 that lies adjacent to and inwardly of portion 15 thereof. The extension adds a certain amount of rigidity to the sheet 8 and tends to properly direct the sheet 8 toward the stylus 2 when the protector 1 is in place upon the tone arm 4.

From the foregoing it is apparent that the protector 1 provides a ductile film sheet 8 upon which the stylus 2 rides as it traverses the groove 6 of record 3. The pressure of the stylus 2 upon the film sheet 8 caused a downward projecting dimple 5 to form in the sheet which projects into the groove 6 and form a cover for the tip of the stylus. The material of which the cover film sheet 8 is composed is of sufficient ductility to withstand the drawing and stretching involved in the formation of this dimple-like cover without ripping or tearing, and of sufficient toughness to withstand reasonable amounts of attrition and abrasion with the record groove walls. It is to be expected, however, that sheet 8 will be pierced by the stylus 2 occasionally because of poor quality records which have worn grooves and thus not afford the full and continuing protection desired. However, under such circumstances the stylus merely follows its normal path in the further traverse of the groove by projecting through the sheet 8. Thereafter and because of its loose connection with arm 4 which permits the sheet 8 to shift with respect to the stylus 2, the protector presents a new point of stylus contact upon a subsequent record playing.

Certain forms of polyethylene sheet material have been found to exhibit exceptional abrasion resistance when employed as stylus protecting film sheets. One of these forms may be referred to as being unilaterally drawn, i.e. unidirectionally drawn, strained or stretched, and this form is derived by stretching a normal unstrained polyethylene sheet beyond its elastic limit in only one direction to thereby impart a permanent strain or deformation in the sheet material. Apparently the molecules of the sheet material striate in parallel courses corresponding to the direction of the applied stress. Following such deformation the material has been found to be peculiarly and especially resistant to abrasive forces when such forces are applied to the material in a direction generally transverse to the course of molecular orientation or direction of stretching and straining thereof.

Another form of polyethylene sheet material which exhibits exceptional abrasion resistance may be referred to as being bidirectionally drawn. The bidirectionally drawn polyethylene sheet material may be derived by stretching a normally unstrained sheet of polyethylene beyond its elastic limit in two directions which are preferably normal to each other. Commercially bidirectionally drawn material is formed by extruding tubular forms composed of polyethylene which are then stretched beyond the elastic limit in a direction along the axis of the tube. Stretching in a direction normal thereto is accomplished by plugging the ends of the tube and thereafter inserting air therein under pressure. This causes the tube to expand and draws the material in another direction which is normal to the original direction of stretching. Sheets of polyethylene drawn in this manner have been found to exert an excellent resistance to abrasion regardless of the direction in which the applied abrasive forces are applied to the sheet material by the stylii.

With reference to FIGS. 1 through 3, film sheet 8 may with advantage be composed of unidirectionally drawn polyethylene sheet material which has previously been stretched in a direction indicated by arrows 52 and 53. The stretching or drawing operation is such that the material is permanently deformed or strained by stretching forces which have been applied in excess of the elastic limit thereof. The straining forces should be carefully controlled, however, to avoid rupturing the material. In its deformed condition, sheet 8 is secured to flexible element 9 as previously indicated, the attachment to element 9 being made in a manner such that the direction of stretch is parallel to the slot 11 of element 9. Thereafter, when the protector 1 is secured on tone-arm 4 as exemplified in FIG. 1, the direction of strain is generally perpendicular to the direction of groove 6 and perpendicular to the tone arm 4. In this position the strained film sheet 8 has been found to have optimum resistance to the abrasive forces exerted on it by the groove walls of the record 3. Polyethylene sheets having a thickness from about ½ to 3 mils are particularly suited for adapting a 1-mil stylus for use with a 78 r.p.m. shellac base record.

Another embodiment of the invention is shown in FIG. 6 wherein a different type of loose connection is provided for securing the film sheet 8 in a freely shiftable position on the tone arm. In this case an elongated flat flexible strap element 22 is provided with a plurality of notches 26 on both sides 23 and 24 and at one end 25 thereof. At the other end 27 there is an enlarged portion 28 which has a slot 29 angled obliquely with respect to the opposite sides 23 and 24, the slot being adapted to receive the opposite end 25 of the strap element 22 and to engage with one or the other of the notches 26. Thus the ends 25 and 27 of the strap are bent around the tone arm and loosely secured thereon by passing the end 25 into the slot 29 wherein it is secured through engagement between the notches and the edges defining the slot 29.

In the embodiment shown in FIG. 6, the stylus protecting film sheet 8 has an end portion 30 which overlies a portion of the strap 22 adjacent to its enlarged portion 28 and the strap is secured to the film sheet 8 by placing a transparent adhesive strip 31 over the portion 30 of film sheet 8 and over portions 32 and 33 of strap element 22 adjacent thereto.

FIGS. 4 and 5 respectively generally illustrate the position of a stylus 34 and protector 37 in a groove of a modern long-playing record 35 and in a deeper groove of an older shellac type record 36. The stylus 34 depicted in both cases is of the 1-mil variety customarily recommended for long-playing records.

With reference to FIG. 4, the film sheet 37, as disposed in the V-shaped record groove 38 between the stylus 34 and the opposite groove walls 39 and 40 is stretched and molded about the tip 41 of the stylus 34 to form a sheath or cover 42 which protects the stylus tip 41 from direct engagement with the groove walls 39 and 40. The stylus pressure on the record is exerted generally laterally to the direction of the groove through the drawn portions 43 and 44 of the cover 42 to the walls 39 and 40 respectively, and the drawn portions 43 and 44 are in frictional contact with the walls rather than the sides 45 and 46 of the rounded stylus tip surface. The cover 42 in its drawn state under the stylus pressure tends to flare out as it passes upwardly of the groove base 47 to the record surface 48 and to press against and conform itself to the groove walls. This tends to distribute the stylus pressure over the wall surfaces and to minimize localized frictional wear along the walls 39 and 40 immediately adjacent to the sides 45 and 46 of the tip surface. Consequently, it is evident that the film sheet 37 not only protects the stylus 34 from wear but additionally protects the record from excess wear and damage by distributing the stylus friction causing pressures over the groove wall surfaces and thus preventing excessive localized wear adjacent to the stylus tip. Should the cover 42 become pierced for some reason or other, the stylus merely passes through the hole produced thereby and continues to traverse the groove in the conventional side wall contacting position. Upon removal of the stylus from the record for another playing, a new point of film sheet contact is presented because of the heretofore illustrated loose type connection with the tone arm.

FIG. 5 illustrates the use of the 1-mil stylus 34 with a deeper-grooved shellac record of the 78 r.p.m. type, a 3-mil stylus being normally recommended for use with such records. In the figure, the tip 41 of the 1-mil stylus 34 is covered and protected by film sheet 37, the cover 42 in its drawn position about the tip 41 providing an effective stylus comparable to one of larger size. Thus, the smaller stylus 34 rides higher in the groove 49 and more in conformance with the position taken by a larger stylus, the record 36 being protected from the normally excessive abrading action of the smaller stylus 34 by the film sheet 37. Furthermore, the film sheet distributes the stylus pressure over a greater surface area of the walls 50 and 51 as illustrated with respect to FIG. 4. Greater distribution of the stylus pressure is one of the prime reasons why larger sized stylii have been previously recommended or necessarily employed for deep groove records, particularly 78 r.p.m. shellac records, the larger stylii presented a greater surface area at the sides of the curved tip surface for contact with the groove walls than smaller stylii. For these reasons the film sheet 37 may be employed to adapt a small, i.e. 1-mil, stylus for a use normally requiring a larger, i.e. 3-mil, stylus. In forming the cover or film layer about the tip of the phonograph stylus an increase in the tip radius is effected, thus creating a situation, in the case of a microgroove or 1-mil stylus, which is similar to that found in the "all purpose" needle size, i.e. the tip of the stylus having a 1-mil radius becomes the equivalent of about a 2-mil, all purpose stylus when utilized in conjunction with for example a 2.5 mil protective film sheet of polyethylene. The disadvantages of the intermediate size tip conventionally employed are not found in this case, because of the yieldable nature of the record contacting material.

FIGS. 7 through 11 illustrate another embodiment of the invention.

Figure 7:
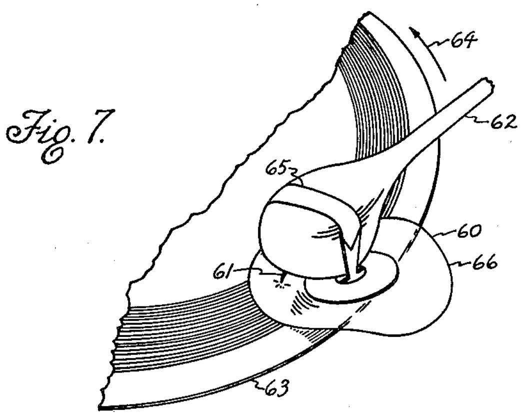
FIG. 7 is a perspective view of still another embodiment showing its relative operating position with respect to a stylus and record.

With particular reference to FIG. 7, the embodiment of the stylus and record protector is generally designated therein by the numeral 60 and is shown in operating relationship between stylus 61 which is carried by tone arm 62 and record 63 which is adapted to revolve in the direction of arrow 64. The protecting element of the protector is a thin membranous circular sheet 66 of preferably bidirectionally drawn polyethylene which is suspended from tone arm 62 by a suspension assembly 65 which permits the sheet to revolve or rotate between successive playings of the record to thereby present a new point of stylus contact upon each successive playing of the record.

Figures 8, 9, 11:
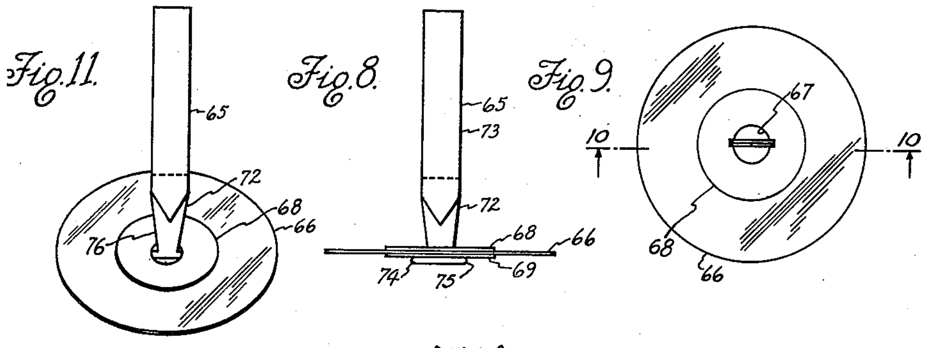
FIG. 8 is a side view of the embodiment shown in FIG. 7.
FIG. 9 is a top view of the embodiment shown in FIG. 8.
FIG. 11 is another side view of the embodiment shown in FIG. 7 and illustrates a position which the protecting component of the embodiment acquires when freely suspended by means of the suspension assembly illustrated therein.
Figure 10:
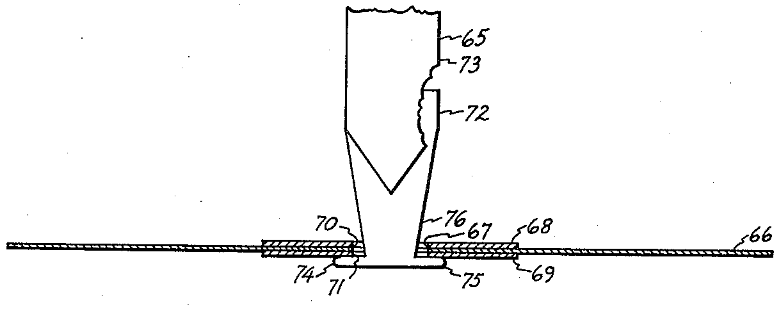
FIG. 10 is an enlarged cross sectional side view taken along the lines 8—8 of FIG. 9, certain parts being broken away.

The suspension assembly of the embodiment shown in FIG. 7 is best illustrated in FIGS. 8, 9 and 10 wherein it will be seen that the circular polyethylene sheet 66 has a centrally located aperture through which a portion of the assembly extends. Because of its thinness, sheet 66 has a tendency to fold or bend and accordingly to facilitate the suspension of the sheet 66, a pair of flat washer or disc-like apertured circular elements 68 and 69 of lesser diameter than that of sheet 66 are respectively secured on opposite sides of the sheet 66 to add rigidity to the protector in the regions thereof which are adjacent to aperture 67. The washers 68 and 69 are preferably of greater rigidity than sheet 66 and are secured to sheet 16 in a position such that their respective holes 70 and 71 are aligned with aperture 67. The suspension assembly 65 further includes an inverted flat T-shaped element 72 and an elongated strip of adhesive type tape 73 which is adherently mounted on the upper end of the element 72 and adapted for adherence to the tone arm of a phonograph.

The T-shaped element 72 extends loosely through aperture 67 and holes 70 and 71 in washers 68 and 69, and the radially extending legs 74 and 75 of the element 72 form shoulders upon which the sheet 66 is supported. As shown in FIG. 10 legs 74 and 75 of element 72 are adapted and arranged to retain the washer supported sheet 69 thereon. The sheet 66 may be removed from the upstanding portion of the protector by bending one or both of the legs to permit the element 72 to pass through the aperture in sheet 66.

Element 72 is preferably flat and loosely connected to the sheet 66 so that the upstanding body portion 76 of the element 72 can shift off center from the vertical axis which extends through aperture 67. This enables the sheet 66 to be supported at a point which is off center from its center of gravity and permits the sheet 66 to tilt downwardly on one side of the element 72 when the sheet is freely suspended by the suspension assembly 65. This is illustrated in FIG. 11. There is a benefit to this type of connection for when the protector is properly attached to a tone arm the lowermost peripheral edge of sheet 66 contacts and is frictionally engaged by the revolving record as the tone arm is shifted into playing position. As such the sheet rotates on its supporting member 76 and assures a new point of contact for the stylus with each successive playing because the sheet 66 rotates prior to being engaged by the stylus and record.

When utilizing the embodiment shown in FIGS. 7 through 11 one preferably should employ a bidirectionally drawn polyethylene sheet material as opposed to a unidirectionally drawn material, since the direction in which the abrading forces are applied relative to the direction of stretch is not controlled but rather determined in accord with the point of stylus contact which is randomly selected.

The results achieved in reproducing sound by the method illustrated herein and wherein a ductile material is provided at the tip of the stylus for contacting with the record groove have been unexpected. For example, one would expect that the output of stylus carrying commercial cartridges would be considerably attenuated. It has been found, however, that the output was attenuated but very slightly. This is illustrated in FIG. 1 wherein datum is presented for response secured in tests with a Westrex 1A test record, an Electrovoice O166 Power Point cartridge (test results are average of results obtained with each of ten samples of this type cartridge), the cartridge being provided with a stylus having a 0.7 mil radius tip, 6 grams tracking force, average compliance: $1.2 \times 10^{-6}$ cm./dyne, and with a 1.0 mil sheet of bidirectionally drawn polyethylene disposed between the stylus tip and record.

*Table I*

| Frequency, kc. | Attenuation, bd. |
|---|---|
| 1 | 0 |
| 2 | 0 |
| 3 | .2 |
| 4 | .1 |
| 5 | .3 |
| 6 | .1 |
| 7 | 0 |
| 8 | .4 |
| 9 | 1 |
| 10 | 1.5 |
| 11 | 1.4 |
| 12 | 1.5 |
| 13 | 1.6 |
| 14 | 1.4 |
| 15 | 1.5 |

No waveform distortion was detected on an oscilloscope at frequencies of 1 kc. to 15 kc. in tests for waveform distortion run utilizing a 1-mil polyethylene sheet between the stylus tip and record with numerous Electrovoice O166 and O126 stereo cartridges at 6, 8 and 10 grams tracking force.

Intermodulation distortion tests have also been conducted wherein a 1-mil bidirectionally drawn polyethylene sheet was utilized as a covering for the cartridge stylus, utilizing cartridges of the above mentioned O166 and O126 types. The tests were made with an Altec TI–402 intermodulation analyzer on an RCA 12–5–37 test record (400 cycles and 4000 cycles—12 db down—peak velocities) at 6 grams tracking force. It was found in these tests that, by utilizing the polyethylene covering for the tip of the stylus, the intermodulation distortion was reduced at most frequencies and at no frequency was there an increase over the distortion with the stylus not covered.

Further tests have indicated that noise is suppressed when reproducing sound from very noisy recordings by the method herein described with the tip of the stylus sheathed by a polyethylene membranous covering during the traversal of the record groove. For example, 20 db of noise was cut into the grooves of a record by applying 30 grams tracking force on a diamond .7 mil stylus for approximately 10 minutes. Tests conducted to ascertain the amount of noise reduction resulting when utilizing a 1-mil polyethylene covering for a stylus employed in the tests indicated 13 db less noise than without the covering.

It may be stated that microscopic examination of used protectors employing a polyethylene stylus covering sheet have indicated that a hole frequently develops in the protective sheet material adjacent the point of stylus contact. However, it has been determined that this hole is not obtained by reason of abrasion at the tip of the stylus but rather because of abrasion at the juncture of the groove walls and the land. From the foregoing it is evident that substantial benefits can be derived in the reproduction of sound mechanically incorporated in phonograph records by sheathing the tip of the groove traversing stylus with a thin ductile material and by causing the record groove to be traversed by the sheathed stylus.

It may be stated that the film sheet is designed to serve at each point of stylus contact only during the playing of one recording. However, upon successive record playings, successively different stylus contact points are encountered because the loose connection with the tone arm permits the protector film sheet to shift beneath the stylus in response to vibrations, etc. The laws of chance governing such random selection of stylus contact points make the reusage of any given worn point or area unlikely.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

This application is a continuation-in-part of my copending now abandoned, application Serial No. 772,556, filed November 7, 1958, entitled Stylus and Record Protector and Adapter Therefor.

What is claimed as new and what it is desired to secure by Letters Patent of the United States is:

1. A protector for phonograph records and stylii comprising a flat ductile film sheet loosely interposable between the stylus and the record with one face in contact with the record and the other face contacted by the stylus.

2. In a phonograph having a pick-up arm and a stylus mounted thereon, a ductile film sheet, means loosely and shiftably connecting said sheet to said pick-up arm and mounting said sheet to extend under said stylus.

3. A protector for a phonograph record and a stylus comprising a film sheet stretchable over the tip of said stylus to be there disposable in the groove of said record between said stylus and said record, and means for freely shiftably connecting said sheet to a phonograph pick-up arm.

4. A stylus cover for use with a phonograph, said cover comprising a thin, tough sheet material member having a body portion disposable shieldingly under the tip of the stylus and an edge portion bounding said body portion, and a tone arm connector in the form of a bendable strap integral with said member along said edge portion thereof supporting said member in shiftable position with respect to said tip.

5. A stylus protector comprising a ductile film sheet stretchable over the tip of said stylus, flexible means secured to said sheet having a slot for connecting said sheet to a pick-up arm of a phonograph, said means being adapted to receive a portion of said pick-up arm through said slot.

6. A stylus and phonograph record protector comprising a ductile film sheet member having an end and respectively opposite sides and being stretchable over the tip of said stylus to be there enterable into the groove of said record around the stylus tip, an elongated bendable element secured to said end of said sheet and extending transversely outwardly beyond said opposite sides of said sheet and having a transverse slot, said element being adapted and arranged to receive a portion of a pick-up arm through said slot and to loosely engage about said arm to freely shiftably hold said sheet in shiftable position underlying said stylus.

7. A phonograph record protector for use in connection with phonographs, said protector comprising a ductile film sheet adapted to be interposed between the phonograph stylus and the record and means for mounting said sheet on the phonograph tone arm, said means comprising an elongated flexible sheet element having a slot extending lengthwise thereof, said film sheet having an end portion overlying a portion of said element adjacent to and intermediate the ends of said slot, and an adhesive strip overlying said end portion of said film sheet and portions of said flexible sheet on either side of said film sheet end portion.

8. A protector for stylii and records comprising a ductile film sheet and means to mount said sheet on a portion of the phonograph, said means comprising an elongated flexible sheet element having an intermediate portion and opposite end portions and side edges, and further having a plurality of spaced notches along one said side edge at one said end portion thereof and having a slot angled obliquely with respect to the opposite sides of said element at the other end portion thereof, said slot being adapted to receive said notched end portion of said flexible element and retainably to engage with a selected one or another of said notches, said film sheet having an end portion adhesively secured to said intermediate portion of said flexible element.

9. An adapter for adapting a stylus, proportioned for use with microgroove disc phonograph records, to use with disc records having wider and deeper grooves, said adapter comprising a thin, tough film sheet member and means to retain said member in freely shiftable underlying contact with the operative tip of said stylus.

10. An adapter for adapting a stylus, proportioned for use with microgroove disc phonograph records, to use with disc records having wider and deeper grooves, said adapter comprising a thin, tough film sheet member and means to retain said member in underlying contact with the operative tip of said stylus, said sheet member being of polyethylene and having a thickness between about one-eighth and one-third of the width dimension of said wider grooves.

11. An adapter for adapting a stylus, carried by a tone arm and proportioned for use with microgroove disc phonograph records, to use with disc records having wider and deeper grooves, said adapter comprising a thin, tough film sheet member and means to retain said member in underlying position with respect to said stylus whereby said sheet member is contacted from above by the tip of said stylus and is in contact with the record under the member when the record is being played by the stylus, said means comprising a strip connector integral with said member engaged loosely about the tone arm which carries said stylus.

12. A protector for phonograph records and stylii comprising a unilaterally drawn ductile film sheet and means to retain said sheet in a position interposed between the stylus and record with one face in contact with the record and the other face contacted by the stylus.

13. In a phonograph having a pick up arm and a stylus mounted thereon for traversing a record groove, a unilaterally stretched ductile film sheet connected to said pick up arm and extending under said stylus and being adapted and arranged to be in contact with the tip of the stylus above and with the record below while the record is being played by the stylus, said sheet being disposed under said stylus with its directional course of stretching perpendicular to the direction of said groove.

14. An adapter for phonograph stylii comprising a unilaterally drawn sheet of polyethylene having a thickness ranging from about ½ to 3 mils and means for connecting said sheet to a phonograph tone arm with the direction of strain perpendicular to said tone arm with the upper surface of said sheet in contact with the tip of said stylus thereby to protect the tip from wear during the playing of a phonograph record.

15. A phonograph record and stylus protector for use with phonographs having a stylus carrying tone arm comprising a ductile film sheet having an aperture, and support means for attaching said sheet to said phonograph, said means comprising a portion extending freely through said aperture and operative to support said sheet with a portion of the sheet disposed between said stylus and said record.

16. A phonograph record and stylus protector for use with phonographs having a stylus carrying tone arm comprising a ductile film sheet having an aperture, and support means for supporting said sheet between said stylus and said record, said means comprising a portion extending freely through said aperture and having a supporting shoulder at one end supportingly disposed beneath said sheet adjacent said aperture and said means comprising means at its other end to attach said support means to said tone arm.

17. A phonograph record and stylus protector for use with phonographs having a stylus carrying tone arm comprising a ductile film sheet having a centrally located aperture, first means attached to said sheet adjacent said aperture to limit the bending of said sheet, and elongated support means extending freely through said aperture having a supporting shoulder at one end supportingly disposed beneath said first means, said support means comprising attachment means at its other end to attach said support means to said tone arm.

18. A phonograph record and stylus protector for use with phonographs having a stylus carrying tone arm comprising a flat circular ductile sheet having a centrally located aperture, a pair of flat annular elements respectively secured to opposite sides of said sheet in alignment with said aperture, said elements being of greater firmness than said sheet to thereby limit bending of said sheet, means for suspending said sheet from said tone arm with a changeable portion of the sheet beneath the tip of said stylus including means connectable with and depending from said tone arm, said depending means extending freely through said aperture and having a supporting shoulder engaging one of said annular elements to thereby support said ductile sheet whereby said sheet is rotatable about said depending means.

19. A phonograph record and stylus protector for use with phonographs having a stylus carrying arm comprising a flat circular ductile sheet having a centrally located aperture, a pair of flat circular washer-like discs respectively attached to opposite sides of said sheet in alignment with said aperture for limiting the bending of said sheet, a flat member of greater rigidity than said sheet having opposite legs extending beneath said discs for supporting said sheet beneath the tip of said stylus, said member further having an upstanding portion joined to said legs and passing freely upwardly through said aperture, and adhesive means attached to said upstanding portion for adherence to said tone arm.

20. A phonograph record and stylus protector for use with phonographs having a stylus carrying arm comprising a flat circular ductile sheet of bidirectionally oriented polyethylene having a centrally located aperture, a pair of flat circular washer like discs respectively attached to opposite sides of said sheet in alignment with said aperture for limiting the bending of said sheet, a flat member of greater rigidity than said sheet having horizontally oppositely extending legs disposed beneath said discs for supporting said sheet beneath the tip of said stylus, said member further having an upstanding portion joined to said legs and passing freely upwardly through said aperture, and adhesive means attached to said upstanding portion for adherence to said tone arm.

21. A phonograph record and stylus protector for use with phonographs having a stylus carrying tone arm comprising a ductile film sheet having an aperture and being composed of bidirectionally oriented polyethylene, and support means having a portion extending freely through said aperture and comprising means to attach said support means to said phonograph, said support means being operative to support said sheet between said stylus and said record with said sheet rotatable on said support means.

22. A phonogrpah record and stylus protector for use with phonographs having a stylus carrying tone arm comprising a ductile film sheet having an aperture, and support means and comprising means to attach said support means to said phonograph and having a portion extending freely through said aperture, said support means being operative to support said sheet with a portion thereof disposed between said stylus and said record, said ductile film sheet being composed of bidirectionally drawn polyethylene.

23. A phonograph record and stylus protector for use with phonographs having a stylus carrying tone arm comprising a ductile film sheet having an aperture, and support means comprising means to attach said support means to said phonograph and having a portion extending freely through said aperture, said support means being operative to support said sheet with a portion thereof disposed between said stylus and said record, said ductile film sheet being composed of polytetrafluoroethylene.

24. A protector for phonograph records and stylii comprising a ductile film sheet and means to retain said sheet in a position interposed between the stylus and the record, said sheet being composed of nylon.

25. In combination with a stylus and a grooved record having a groove for traversal by said stylus, a polyethylene sheet having a thickness of less than about 3 mils, and means for disposing said sheet in underlying contact with the tip of said stylus and in overlying contact with the record during traversal of the groove by the stylus thereby to protect the surface in said groove from stylus wear.

26. A protector for phonograph records and stylii comprising a ductile film forming sheet and means to retain said sheet in a position interposed between the stylus and the record, said sheet being composed of polyethylene.

27. A protector for phonograph records and stylii comprising a ductile film forming sheet and means to retain said sheet in a position interposed between the stylus and the record, said sheet being composed of polytetrafluoroethylene.

References Cited in the file of this patent

UNITED STATES PATENTS

| | | |
|---|---|---|
| 1,511,860 | Winer | Oct. 14, 1924 |
| 2,497,366 | Nicole | Feb. 14, 1950 |